Feb. 6, 1923.

E. V. LAWRENCE.
BRAKE.
FILED AUG. 8, 1918.

Inventor
Edward V. Lawrence
By his Attorneys
Marshall & Dearborn

Feb. 6, 1923.
E. V. LAWRENCE.
BRAKE.
FILED AUG. 8, 1918.
1,444,194.
2 SHEETS—SHEET 2.
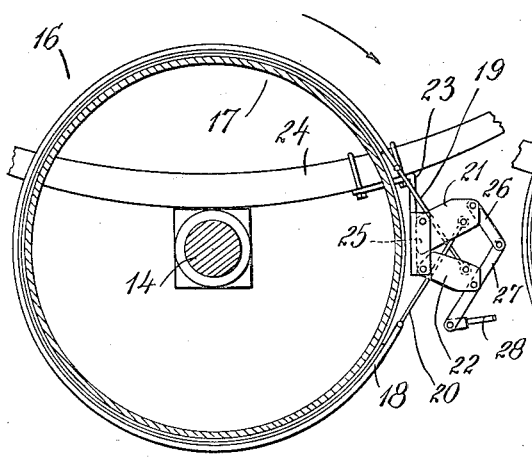
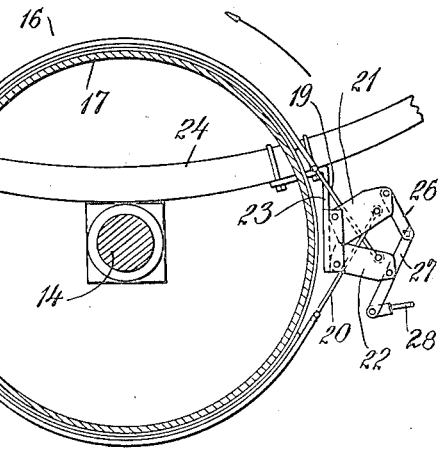
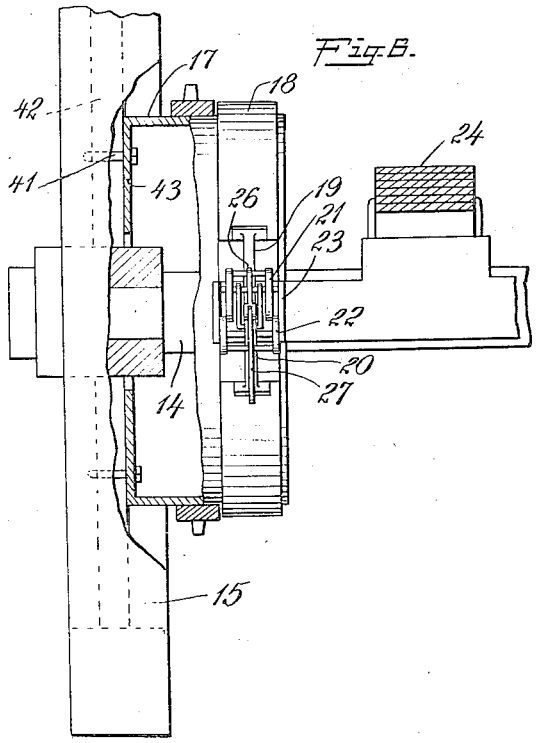
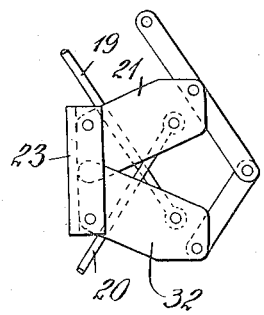
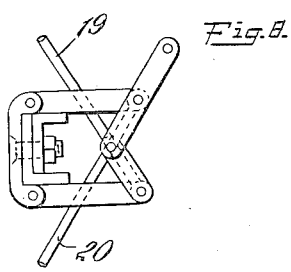
Edward V. Lawrence, Inventor
By his Attorneys
Marshall & Dearborn Patented Feb. 6, 1923.

1,444,194

UNITED STATES PATENT OFFICE.

EDWARD V. LAWRENCE, OF ENGLEWOOD, NEW JERSEY, ASSIGNOR TO E. V. LAWRENCE SAFETY BRAKE COMPANY, INC., OF NEW YORK, N. Y., A CORPORATION OF NEW YORK.

BRAKE.

Application filed August 8, 1918. Serial No. 248,871.

*To all whom it may concern:*

Be it known that I, EDWARD V. LAWRENCE, a citizen of the United States of America, and a resident of Englewood, county of Bergen, and State of New Jersey, have invented certain new and useful Improvements in Brakes, of which the following is a specification, reference being had to the accompanying drawings, forming a part thereof.

My invention relates to brakes and has special reference to band brakes which are applicable to trucks, wagons, trailers and the like.

In my copending application Serial Nos. 9504 filed Feb. 20, 1915, and 111,978 filed July 29, 1916, which latter application has matured into Patent No. 1,370,131, March 1, 1921, I have shown and described automatic brakes which are dependent on a forward and back movement of a wagon or trailing vehicle member, relative to the tractor or drawing means, for governing the brake.

My present invention pertains to brakes of the same general character and has for one of its objects to provide a brake which may readily be adapted for use either as an automatic or as a hand or foot operated brake.

Another object is to provide a brake mechanism which is adapted to operate equally well for either direction of wheel rotation, but which by a slight interchange of parts may be modified to be released by a backward turning movement of the wheel and thus adapted for use as an automatic brake.

Still another object is to provide a band brake which may readily be substituted for brake shoes in an ordinary wagon brake equipment.

In order that my invention may be thoroughly understood I will now proceed to describe the same in the following specification, and will then point out the novel features thereof in appended claims.

Referring to the drawings:

Figure 3 shows the application of the brake of Figure 2 as a substitute for the brake shoe of an ordinary wagon brake mechanism.

Figures 4 and 5 are elevations drawn to a larger scale illustrating the brake band of Figure 1, together with its actuating mechanism as effected by forward and backward wheel rotation. In Figure 4 the wheel is shown rotating forwardly with the brake set, and in Figure 5 it is shown rotating backwardly and the brake released independently of the actuating members.

Figure 6 is a front elevation of the brake mechanism shown in Figure 4.

Figure 7 shows on a still larger scale the brake operating parts adapted for reversible action corresponding to Figure 2.

Figure 8 shows a modified brake structure corresponding to Figure 7.

Figure 1:
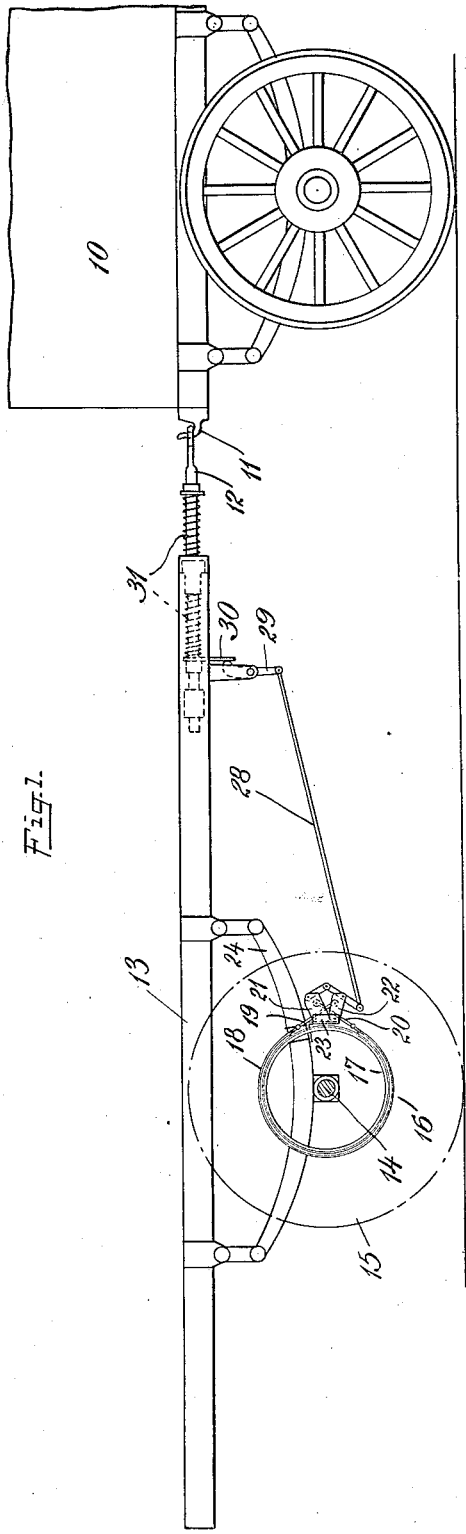
Figure 1 is an elevation showing the rear end of a tractor to which is attached a trailer having brakes arranged and constructed in accordance with my invention and adapted for automatic operation.

Referring to Figures 1, 4, 5 and 6, 10 designates a tractor having a trail hook 11 to which a draw bar 12 of trailer 13 is connected. The trailer has an axle 14, wheels 15, and brakes 16. The brakes are similar to each other and only one is illustrated or described.

It comprises a brake drum 17 which is attached to the wheel 15 in any suitable manner and a brake band 18 which is wrapped upon the drum 17 and has extension links 19 and 20. These links are crossed and are connected at their outer ends to levers 21 and 22 which are pivoted at their inner ends on a stationary bracket or support 23. As shown in Figures 4 and 5, this bracket may be connected to the vehicle spring 24 close to the axle but it may obviously be mounted on any suitable carrier extending from the axle.

The lever 21 has a lug 25 which prevents the rotation of the arm in one direction, the arrangement of parts being such that this lever forms an abutment for the brake band and prevents the rotation of the band when the wheel and brake drum rotate in a forward direction.

The other arm 22 has its inner end beveled so that it is free to swing to permit a limited rotative adjustment of the brake band when the wheel and drum turn in a backward direction.

As more fully explained below this backward movement releases the brake independently of the brake actuating lever and permits the backing of the vehicle when equipped with the automatic brake.

The outer ends of the levers 21 and 22 may be separated to wrap the band about the drum in any suitable manner. I prefer however, to utilize toggle links 26 and 27, to one of which an actuating rod 28 is connected.

The rod 28 in the arrangement of Figure 1 is connected to a lever 29 which is actuated by a projection 30 of the draw bar 12 in response to a forward and back movement of the trailer relative to the tractor. The draw bar is centered by springs 31, the arrangement of parts being such that when the tractor is pulling the trailer, the projection 30 is separated from the lever 29. When the trailer is pushing against the tractor the lever 29 is actuated and the brake set provided the wheel is turning in a forward direction or is at rest. When the tractor is backing the trailer, the lever 29 is obviously actuated, but the backward rotative movement of the wheel and drum swings the lever 22 which is beveled at its end to permit such action, so as to release the brake.

The lever 22 may be replaced by a lever 32 which corresponds to lever 21 and constitutes an abutment for the opposite end of the band. In this arrangement the brake is set whenever a pull is exerted on the brake rod 28. The arrangement of Figure 2 is thus particularly adapted for hand or foot operated brake mechanisms.

Figure 2:
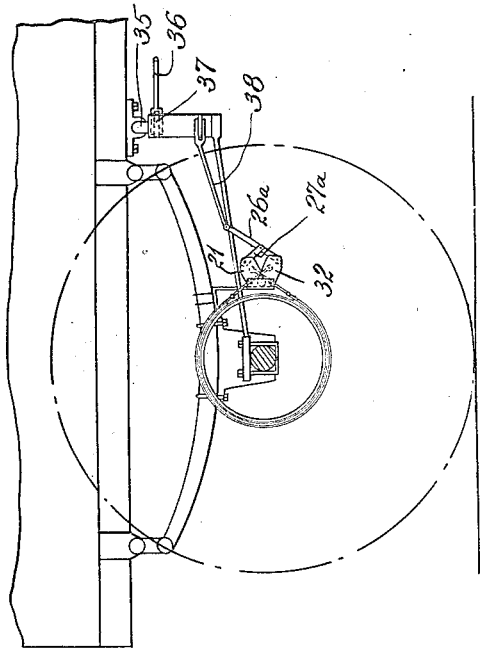
Figure 2 shows the brake as modified by the substitution of a single part to render it operative for either direction of wheel rotation, whereby it is adapted for operation by a hand or foot lever.
Figure 2:
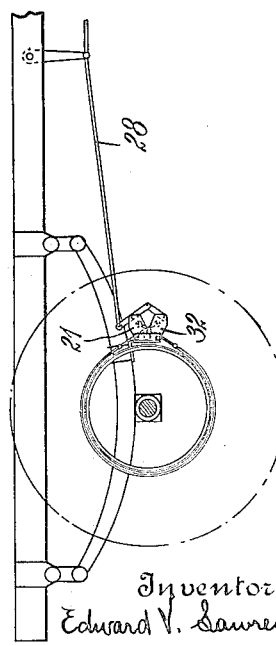

In Figure 3 I have shown the brake mechanism of Figure 2 as substituted for the brake shoes of any ordinary wagon brake mechanism. In this figure, 35 designates the rocker arm to which the shoe is usually connected and 36 the pull rod which actuates the rocker arm through a pivoted lever 37. A push rod 38 is connected to the rocker arm and is joined to the toggle link 26ª which corresponds to the link 26 and is provided with a link 27ª which corresponds to the link 27. Links 26ª and 27ª are connected to the levers 32 and 21 but the actuating link is changed from a first-class lever to a second-class lever by pivoting it at an intermediate point on one of the levers (21) and connecting it at one end to its cooperating toggle link, so that the push rod 38 performs the same function as the pull rod 28 of the Figure 2 construction.

The brake drum 17 may be removably attached to the wheel 15 by means of U-bolts 41 which engage the wheel spokes 42 and extend through suitable holes in a flange 43 of the brake drum.

Attention is directed to the fact that the brake actuating mechanism is particularly simple and compact, has relatively few parts all of which can be readily made in large quantities at small expense. The principal links and actuating arms such as the links 26 and 27, and the arms 21 and 22 may be formed from standard stock by cutting and shearing operations.

The same parts by a slight rearrangement, are adapted to be actuated by either a pull rod such as the rod 28 or a push rod such as the rod 38.

It is also evident that a brake equipment may be readily attached to a wagon previously equipped with a shoe brake, with very slight changes, the shoe brake being decidedly unsatisfactory because large percentages of wheels in use are not truly circular, and because not only are the shoes themselves worn out very rapidly but also the wheel tires are worn and necessitate the early replacement of these expensive steel parts.

The improved structure of my invention is thus an extremely flexible one as well as one which is particularly simple and adapted to be manufactured at small cost.

Structures of preferred form and construction have been illustrated and described for the purpose of showing ways in which this invention may be used, but the inventive thought upon which this application is based, is broader than these illustrative embodiments thereof, and I thereof intend no limitations other than those imposed by the appended claims.

What I claim is:

1. A brake comprising a brake drum, a band, a fixed support, a pair of levers pivoted thereon and connected to the respective ends of the band, toggle links connecting the outer ends of the levers and an actuating member connected to one of the toggle links, at least one of said levers being arranged to swing only to a limited extent in one direction to constitute an abutment for the end of the band to which it is connected.

2. A brake comprising a brake drum, a band, a fixed support, a pair of levers pivoted thereon and connected to the respective ends of the band, one of said levers having a stop projection to prevent turning in one direction and the other being adapted to swing through a limited arc in one direction and to swing freely in the opposite direction, toggle links connecting the outer ends of the levers, and an actuating member connected to one of the toggle links.

3. A brake structure arranged for automatic and hand brake operation, comprising a brake drum, a band, a fixed support, a pair of levers pivoted thereon and connected to the respective ends of the band, toggle links connecting the outer ends of the levers, and an actuating member connected to one of the toggle links, said levers being arranged to constitute abutments for the respective ends of the band to which they are connected and one of said levers being adapted for a limited motion in one direction whereby the brake is automatically released upon backward wheel rotation.

4. A brake comprising a brake drum, a band, a fixed support, a pair of levers pivoted thereon and connected to the respective ends of the band, toggle links connecting the outer ends of the levers, one of said links having an extension, and an actuating member connected to the link extension, said extension link being adapted to be changed in position to act as either a first-class or a second-class lever to accommodate the actuating direction of the actuating member.

5. A brake comprising a brake drum, a band, a fixed support, a pair of levers pivoted thereon and connected to the respective ends of the band, a pair of toggle links connecting the outer ends of the levers, an actuating extension on one of said links, an actuating rod connected to the actuating link extension, said extension link being adapted to be changed into position to act either as a first-class or a second-class lever for adapting the mechanism to be actuated either by a push rod or a pull rod as desired.

6. A vehicle brake adapted to be automatically released to permit the backing of the vehicle comprising a brake drum affixed to a brake wheel, a brake band cooperating therewith, a support substantially fixed relative to the vehicle axle, a pair of levers pivoted to the support and connected to the respective ends of the brake band, toggle links connected to the outer ends of the levers and an actuating member connected to one of the toggle links, the levers being so arranged as to hold the band against rotation with the wheel and drum in one direction and to permit a limited rotation in the opposite direction, sufficient to release the brake band.

In witness whereof, I have hereunto set my hand this 27 day of June, 1918.

EDWARD V. LAWRENCE.